United States Patent
Lee et al.

(10) Patent No.: US 11,576,148 B2
(45) Date of Patent: Feb. 7, 2023

(54) METHOD FOR TRANSMITTING SIDELINK MESSAGE BY TERMINAL IN WIRELESS COMMUNICATION SYSTEM, AND TERMINAL USING SAME METHOD

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 2 days.

(21) Appl. No.: 16/651,125

(22) PCT Filed: Oct. 15, 2018

(86) PCT No.: PCT/KR2018/012133
§ 371 (c)(1),
(2) Date: Mar. 26, 2020

(87) PCT Pub. No.: WO2019/074348
PCT Pub. Date: Apr. 18, 2019

(65) Prior Publication Data
US 2020/0288431 A1    Sep. 10, 2020

Related U.S. Application Data

(60) Provisional application No. 62/583,392, filed on Nov. 8, 2017, provisional application No. 62/572,299, filed on Oct. 13, 2017.

(51) Int. Cl.
*H04W 72/04* (2009.01)
*H04W 72/02* (2009.01)
(Continued)

(52) U.S. Cl.
CPC ............. *H04W 72/02* (2013.01); *H04W 4/40* (2018.02); *H04W 56/001* (2013.01);
(Continued)

(58) Field of Classification Search
CPC ..... H04W 72/02; H04W 4/40; H04W 56/001; H04W 72/0406; H04W 72/0446;
(Continued)

(56) References Cited

U.S. PATENT DOCUMENTS

2012/0269122 A1* 10/2012 Lee .................. H04W 76/36
370/328
2015/0085124 A1* 3/2015 Poppe ..................... A61B 5/18
348/148

(Continued)

FOREIGN PATENT DOCUMENTS

EP        3297364 A1    3/2018
KR    1020170110069    10/2017
(Continued)

OTHER PUBLICATIONS

Intel Corporation: "Sidelink Carrier Aggregation for Mode-4 LTE V2\i Communication",3GPP Draft; R1-1717330—Intel—V2X_ SLCA_M4, 3rd Generation Partnership Project (3GPP)), Oct. 2017.*
(Continued)

*Primary Examiner* — Lakeram Jangbahadur
(74) *Attorney, Agent, or Firm* — Dentons US LLP

(57) ABSTRACT

Provided is a method for transmitting a sidelink message by a terminal in a wireless communication system. The method comprises: selecting at least one sidelink message among a plurality of sidelink messages, on the basis of the importance of each of the sidelink messages; selecting at least one carrier among a plurality of predetermined carriers, on the basis of the priority of each of the carriers and the importance of the selected at least one sidelink message; and transmitting the selected at least one sidelink message through the selected at least one carrier, wherein a sidelink message having relatively high importance among the selected at least one sidelink message is preferentially (Continued)

transmitted through a carrier having relatively high priority among the selected at least one carrier.

10 Claims, 18 Drawing Sheets

(51) Int. Cl.
| | | |
|---|---|---|
| *H04W 4/40* | (2018.01) | |
| *H04W 56/00* | (2009.01) | |
| *H04W 72/10* | (2009.01) | |
| *H04W 72/12* | (2009.01) | |
| *H04W 92/18* | (2009.01) | |

(52) U.S. Cl.
CPC ... *H04W 72/0406* (2013.01); *H04W 72/0446* (2013.01); *H04W 72/10* (2013.01); *H04W 72/1242* (2013.01); *H04W 92/18* (2013.01)

(58) Field of Classification Search
CPC . H04W 72/10; H04W 72/1242; H04W 92/18; H04W 56/0015; H04W 4/46
See application file for complete search history.

(56) References Cited

U.S. PATENT DOCUMENTS

| | | | | |
|---|---|---|---|---|
| 2017/0331577 A1* | 11/2017 | Parkvall | .................. | H04W 8/18 |
| 2018/0070264 A1* | 3/2018 | Saiwai | .................. | H04W 72/04 |
| 2018/0332585 A1* | 11/2018 | Faurie | ..................... | H04W 4/70 |
| 2019/0053253 A1* | 2/2019 | Jung | ..................... | H04W 76/23 |
| 2019/0124669 A1* | 4/2019 | Luo | ......................... | H04W 4/44 |
| 2019/0150147 A1* | 5/2019 | Lee | .................. | H04W 72/1278 |
| | | | | 370/336 |
| 2019/0394786 A1* | 12/2019 | Parron | ................ | H04L 27/0006 |
| 2020/0015255 A1* | 1/2020 | Khoryaev | ......... | H04W 72/1289 |
| 2020/0137814 A1* | 4/2020 | Ayaz | ..................... | H04W 76/27 |
| 2020/0374151 A1* | 11/2020 | Meier | ..................... | H04L 12/40 |

FOREIGN PATENT DOCUMENTS

| | | |
|---|---|---|
| WO | 2016186059 | 11/2016 |
| WO | 2017138798 | 8/2017 |

OTHER PUBLICATIONS

Qualcomm Incorporated: "Carrier Aggregation for V2X Phase 2", 3GPP Draft; R2-1710684-CA for V2X Phase 2, 3rd Generation Partnership Project (3GPP)), Oct. 2017.*
Discussion on the impacts of CA on V2X requirements, R1-1711267), Oct. 2017.*
Intel Corporation, "Sidelink Carrier Aggregation for Mode-4 LTE V2V Communication," R1-1717330, 3GPP TSG RAN WG1 Meeting #90bis, Sep. 30, 2017, see sections 2-4.
Huawei et al., "Discussion on the Impacts of CA on V2X Requirements," R4-1711267, 3GPP TSG RAN WG4 Meeting #84bis, Oct. 2, 2017, see section 2.
R2-1710684: 3GPP TSG RAN WG2 Meeting #99bis, Prague, Czechia, Oct. 9-13, 2017, Qualcomm Incorporated, "Carrier Aggregation for V2X Phase 2," (7 Pages).

* cited by examiner (a)

(b)

METHOD FOR TRANSMITTING SIDELINK MESSAGE BY TERMINAL IN WIRELESS COMMUNICATION SYSTEM, AND TERMINAL USING SAME METHOD

This application is the National Stage filing under 35 U.S.C. 371 of International Application No. PCT/KR2018/012133, filed on Oct. 15, 2018, which claims the benefit of U.S. Provisional Applications No. 62/572,299 filed on Oct. 13, 2017, and No. 62/583,392 filed on Nov. 8, 2017, the contents of which are all hereby incorporated by reference herein in their entirety.

FIELD OF THE DISCLOSURE

The disclosure relates to wireless communication and, more particularly, to a method for a user equipment (UE) to transmit a sidelink message in a wireless communication system and a UE using the method.

RELATED ART

Vehicle-to-everything (V2X) communication refers to communication between a user equipment (UE) installed in a vehicle and another device, for example, a UE installed in another vehicle, a device installed on a road, or a UE carried by a pedestrian. Cellular-V2X (C-V2X) refers to V2X communication based on a cellular communication technology.

In next-generation V2X communication, unlike in existing V2X communication, introduction of carrier aggregation is under discussion. Carrier aggregation refers to a technique of combining carriers to be used for communication. It is possible to combine contiguous carriers or noncontiguous carriers.

In this case, an efficient carrier selection method (and/or a frequency band usage method) related to sidelink message transmission is required in view of coexistence of LTE V2X and other technologies/services (e.g., dedicated short-range communication and Wi-Fi) (on an unlicensed frequency band (e.g., a 5.9-GHz band) and a UE type having limited transmission and/or reception capabilities. Therefore, a sidelink message transmission method considering carrier aggregation is proposed.

SUMMARY

An aspect of the disclosure is to provide a method for a user equipment (UE) to transmit a sidelink message in a wireless communication system and a UE using the method.

In one aspect, provided is method for transmitting a sidelink message in a wireless communication system, the method performed by a user equipment (UE) and comprising: selecting one or more sidelink messages from among a plurality of sidelink messages based on an importance level of each of the plurality of sidelink messages; selecting one or more carriers from among a plurality of preconfigured carriers based on a priority of the carriers and the importance level of the selected one or more sidelink messages; and transmitting the selected one or more sidelink messages through the selected one or more carriers, wherein a sidelink message having a relatively high importance level among the selected one or more sidelink messages is preferentially transmitted through a carrier having a relatively high priority among the selected one or more carriers.

The importance level of each of the sidelink messages may be such that a message comprising information on an object detected at a position relatively close to the UE has a high importance level.

The importance level of each of the sidelink messages may be such that a message comprising information having a relatively high confidence level with respect to a detected object has a high importance level.

The importance level of each of the sidelink messages may be such that a message comprising information on a detected object having a relatively high detected object priority previously configured has a high importance level.

The importance level of each of the sidelink messages may be such that a message comprising information on a relatively large number of detected objects has a high importance level.

The importance level of each of the sidelink messages may be such that a message requiring relatively low latency has a high importance level.

The priority of the carriers may be such that a carrier configured for UEs having limited reception capability to commonly perform reception has a high priority.

The priority of the carriers may be such that a carrier on which a different radio access technology (RAT) is less likely to exist has a high priority.

The priority of the carriers may be such that a carrier on which sidelink communication based on long-term evolution (LTE) is configured to have a relatively high communication priority has a high priority.

The priority of the carriers may be such that a carrier on which a sidelink synchronization signal (SLSS) is transmitted has a high priority.

Based on a congestion level of the carrier having the relatively high priority among the selected one or more carriers being higher than a preset threshold, only the sidelink message having the relatively high importance level among the selected one or more messages may be transmitted through the carrier having the relatively high priority among the selected one or more carriers.

The sidelink message having the relatively high importance level may comprise information coded with low resolution.

The UE may transmit information necessary to decode the information coded with the low resolution into high resolution through a carrier having a relatively low priority among the selected one or more carriers.

Based on a congestion level of the carrier having the relatively high priority among the selected one or more carriers being lower than a preconfigured threshold, all the selected one or more sidelink messages may be transmitted through the carrier having the relatively high priority among the selected one or more carriers regardless of the importance level.

In another aspect, a user equipment (UE) is provided. The UE comprises a transceiver to transmit and receive a radio signal; and a processor coupled with the transceiver to operate, wherein the processor selects one or more sidelink messages from among a plurality of sidelink messages based on an importance level of each of the plurality of sidelink messages; selects one or more carriers from among a plurality of preconfigured carriers based on a priority of the carriers and the importance level of the selected one or more sidelink messages; and transmits the selected one or more sidelink messages through the selected one or more carriers, wherein a sidelink message having a relatively high importance level among the selected one or more sidelink messages is preferentially transmitted through a carrier having a relatively high priority among the selected one or more carriers.

According to the disclosure, when a UE for which a plurality of carriers is previously configured performs sidelink transmission, the UE may transmit a message through a carrier having the highest priority according to the priority of a carrier and the importance level of a message to be transmitted or may transmit a message having a relatively high importance level through a carrier having a relatively high priority, thereby performing efficient sidelink communication, for example, by avoiding a carrier having a high congestion level or a carrier used for a different radio communication technology according to the importance level of a message to be transmitted by the UE.

Further, when the UE that performs sidelink transmission has limited TX capability or when the UE that performs sidelink reception has limited RX capability, the UE may preferentially transmit/receive a message having a relatively high importance level under the limited TX/RX capability, thus increasing the accuracy and efficiency of sidelink communication.

DESCRIPTION OF EXEMPLARY EMBODIMENTS

Figure 1:
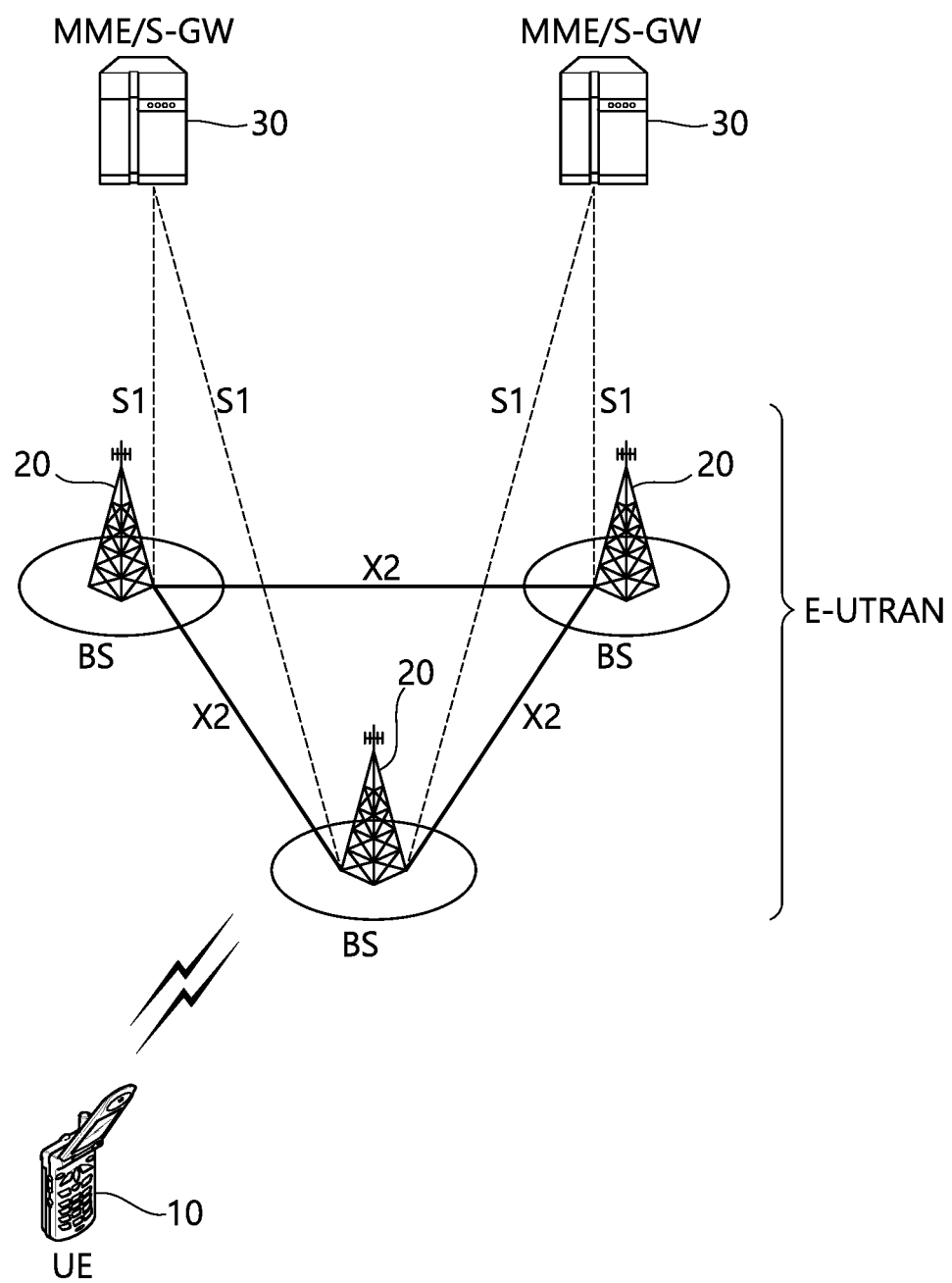
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system may be a TDD (time division duplex) system, a FDD (frequency division duplex) system, or a system using both of the TDD and the FDD.

Figure 2:
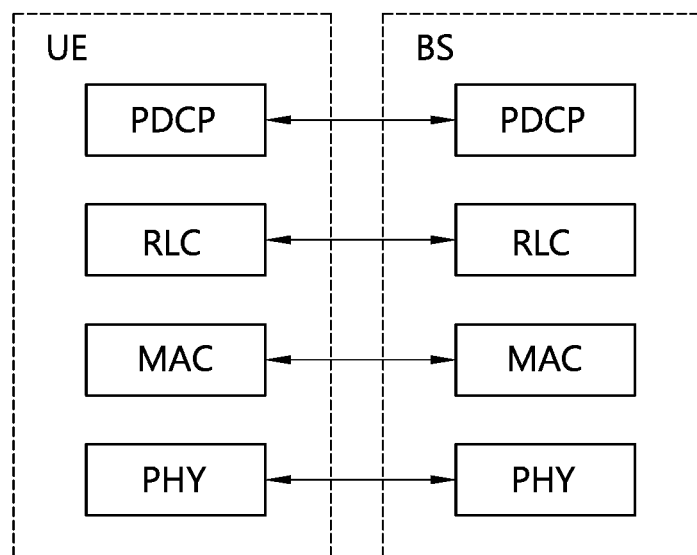
FIG. 2 is a diagram showing a wireless protocol architecture for a user plane.
Figure 3:
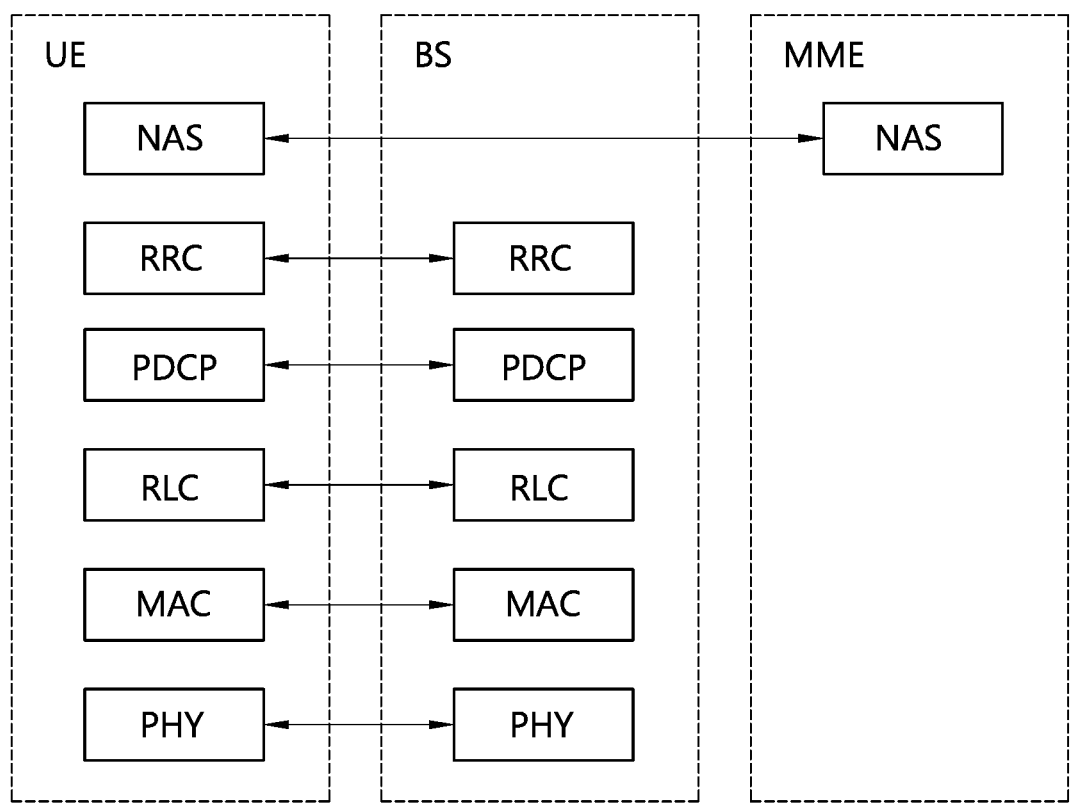
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Now, V2X communication is described. V2X refers to communication between a UE installed in a vehicle and another UE. The other UE may be a pedestrian, a vehicle, or infrastructure. In this case, V2X may be respectively referred to as V2P (vehicle to pedestrian), V2V (vehicle to vehicle) and V2I (vehicle to infrastructure).

V2X communication can transmit and receive data/control information through a sidelink defined in D2D operation instead of uplink/downlink between a base station and a UE used in LTE.

The following physical channels can be defined for the sidelink.

PSBCH is a physical sidelink broadcast channel PSCCH is a physical sidelink control channel PSDCH is a physical sidelink discovery channel. PSSCH is a physical sidelink shared channel SLSS is a sidelink synchronization signal. SLSS may include a PSSS (Primary Sidelink Synchronization Signal) and an SSSS (Secondary Sidelink Synchronization Signal). The SLSS and the PSBCH can be transmitted together.

The sidelink can refer to an interface between UEs and can correspond to PC5 interface.

Figure 4:
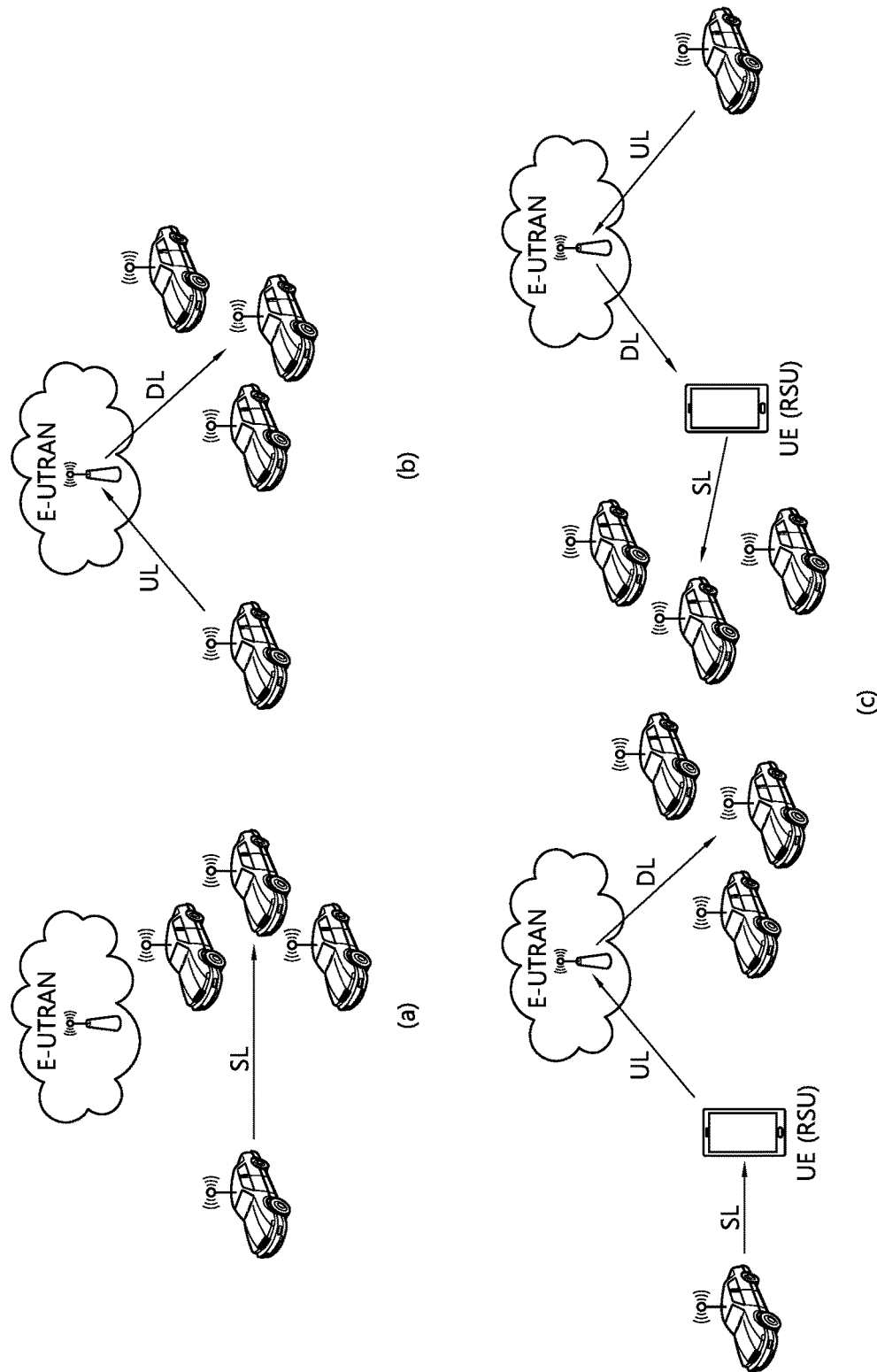
FIG. 4 illustrates scenarios for V2X communication.

FIG. 4 illustrates scenarios for V2X communication.

Referring to FIG. 4(a), V2X communication may support an information exchange operation (between UEs) based on the (sidelink) PC5 interface between UEs, and as shown in FIG. 4(b), V2X communication may support an information exchange operation (between UEs) based on the Uu interface between an eNodeB and a UE. Also, as shown in FIG. 4(c), V2X communication may support an information exchange operation (between UEs) by using both of the PC5 and Uu interfaces.

Figure 5:
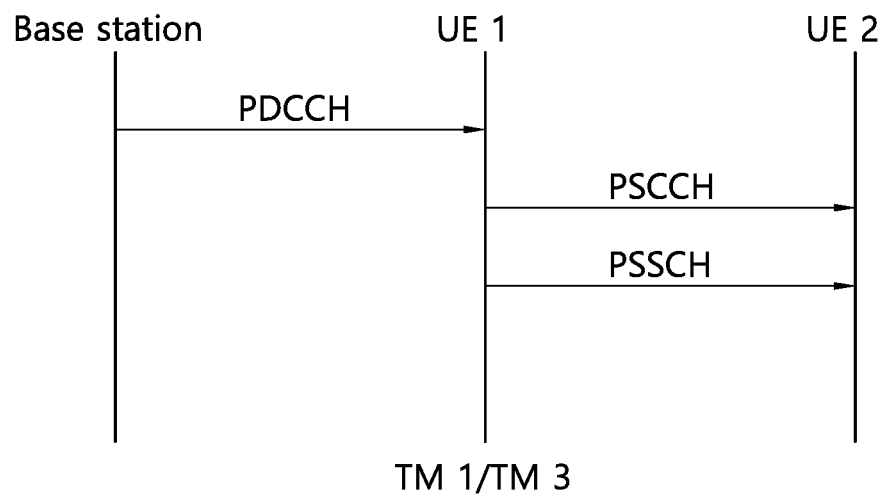
FIG. 5 illustrates a UE operation according to transmission mode (TM) related to V2X/D2D.
Figure 5:
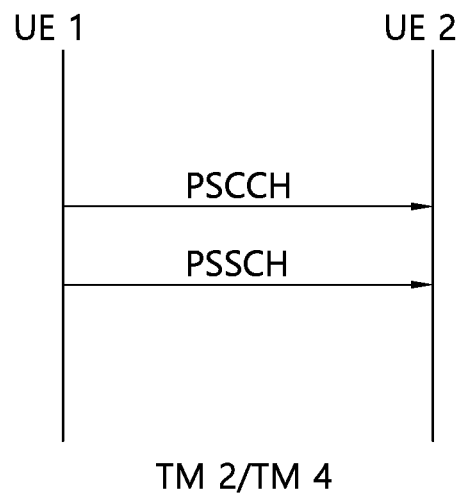

FIG. 5 illustrates a UE operation according to transmission mode (TM) related to V2X/D2D.

FIG. 5(a) illustrates the transmission mode 1 and 3; and FIG. 5(b) illustrates the transmission mode 2 and 4. In the transmission mode 1/3, an eNB performs resource scheduling for UE 1 through a PDCCH (more specifically, DCI), and UE 1 performs D2D/V2X communication with UE 2 according to the corresponding resource scheduling. After transmitting sidelink control information (SCI) to the UE 2 through a Physical Sidelink Control Channel (PSCCH), UE 1 may transmit data based on the SCI through a Physical Sidelink Shared Channel (PSSCH). The transmission mode 1 may be applied for D2D communication, and transmission mode 3 may be applied for V2X communication.

The transmission mode 2/4 may be considered to be the mode in which a UE performs scheduling by itself. More specifically, the transmission mode 2 may be applied for D2D communication, and a UE may select a resource by itself within a configured resource pool to perform the D2D operation. The transmission mode 4 may be applied for V2X communication, and a UE may perform the V2X operation after selecting a resource by itself within a selection window after conducting a sensing/SA decoding process and so on. After transmitting the SCI to UE 2 through the PSCCH, UE 1 may transmit data based on the SCI through the PSSCH. In what follows, the transmission mode may be abbreviated to mode.

While the control information that an eNB transmits to a UE through a PDCCH is called downlink control information (DCI), the control information transmitted by a UE to another UE through a PSCCH may be called SCI. SCI may transfer sidelink scheduling information. SCI may be implemented in various formats; for example, SCI format 0 and SCI format 1 may be used.

The SCI format 0 may be used for scheduling of a PSSCH. The SCI format 0 may include a frequency hopping flag (1 bit), resource block allocation and hopping resource allocation field (the number of bits of which may differ according to the number of resource blocks of a sidelink), time resource pattern (7 bits), modulation and coding scheme (5 bits), time advance indication (11 bits), and group destination ID (8 bits).

The SCI format 1 may be used for scheduling of a PSSCH. The SCI format 1 includes priority (3 bits), resource reservation (4 bits), frequency resource position of initial transmission and retransmission (the number of bits of which may differ according to the number of subchannels of a side link), time gap between initial transmission and retransmission (4 bits), MCS (5 bits), retransmission index (1 bit), and reserved information bits. Hereinafter, the reserved information bit may be called reserved bit for short. The reserved bits may be added until the bit size of the SCI format 1 becomes 32 bits. In other words, the SCI format 1 includes a plurality of fields carrying different information, the remaining bits excluding the total number of bits of the plurality of fields from the fixed total number of bits (32 bits) may be called reserved bits.

The SCI format 0 may be used for transmission mode 1 and 2; and the SCI format 1 may be used for transmission mode 3 and 4.

Hereinafter, the disclosure is described.

First, for the understanding of the disclosure, a sidelink received signal strength indicator (S-RSSI), physical sidelink shared channel (PSSCH) reference signal received power (PSSCH-RSRP), a channel busy ratio (CBR), and a channel occupancy ratio (CR) are described.

<S-RSSI>

Sidelink RSSI (S-RSSI) may be defined as the linear average of the total received power (in [W]) per SC-FDMA symbol observed by the UE only in the configured subchannel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a >=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, the disclosure is described in detail.

For example, proposed below are methods for a UE to efficiently transmit a V2X message when a plurality of (V2X) carriers is configured (/signaled) by carrier aggregation (CA).

In one example, (some of) the proposed methods of the disclosure may be limitedly applied to intra-band ((non-)contiguous) CA.

In one example, V2X communication modes may be (typically) classified into (A) a mode (Mode #3) in which a base station signals (/controls) V2X message transmission (/reception)-related scheduling information (on a V2X resource pool previously configured (/signaled) (from the base station (/network))) (e.g., mainly for a UE located in the communication coverage of the base station (and/or in an RRC_CONNECTED state)) and/or (B) a mode (Mode #4) in which a UE (autonomously) determines (/controls) V2X message transmission (/reception)-related scheduling information (on a V2X resource pool previously configured (/signaled) (from a base station (/network))) (e.g., mainly for a UE located inside/outside the communication coverage of the base station (and/or in an RRC_CONNECTED/IDLE state)).

In one example, a "sensing operation" mentioned herein may be interpreted as a PSSCH-RSRP measurement operation based on a PSSCH DM-RS sequence (scheduled by a successfully decoded PSCCH) and/or an S-RSSI measurement operation (based on a V2X resource pool-related subchannel).

In one embodiment, "reception" mentioned herein may be interpreted (in an extended manner) as (at least) one of (A) an operation of decoding (/receiving) a V2X channel (/signal) (e.g., a PSCCH, a PSSCH, a physical sidelink broadcast channel (PSBCH), a PSSS/SSSS, or the like) (and/or an operation of decoding (/receiving) a WAN DL channel (/signal) (e.g., a PDCCH, a PDSCH, a PSS/SSS, or the like) and/or (B) a sensing operation and/or (C) a CBR measurement operation.

In one example, "transmission" mentioned herein may be interpreted (in an extended manner) as an operation of transmitting a V2X channel (/signal) (e.g., a PSCCH, a PSSCH, a PSBCH, a PSSS/SSSS, or the like) (and/or an operation of transmitting a WAN UL channel (/signal) (e.g., a PUSCH, a PUCCH, an SRS, or the like)).

In one example, a "carrier" mentioned herein may be interpreted (in an extended manner) as (A) a carrier set (/group) previously configured (/signaled) and/or (B) a V2X resource pool (set (/group)) and/or (C) a (time/frequency) resource (set (/group)) (on a carrier) and/or (D) a carrier.

In one example, a "synchronization signal" mentioned herein may be interpreted (in an extended manner) to include not only a sidelink synchronization signal (SLSS) but also a PSBCH.

In next-generation V2X communication, introduction of carrier aggregation is under discussion. In this case, an efficient carrier selection method (and/or a frequency band usage method) related to V2X message transmission is required in view of coexistence of LTE V2X and other technologies/services (e.g., dedicated short-range communication and Wi-Fi) (on an unlicensed frequency band (e.g., a 5.9-GHz band) and a UE type having limited transmission and/or reception capabilities. Therefore, a V2X message transmission method of a UE considering carrier aggregation is proposed.

Figure 6:
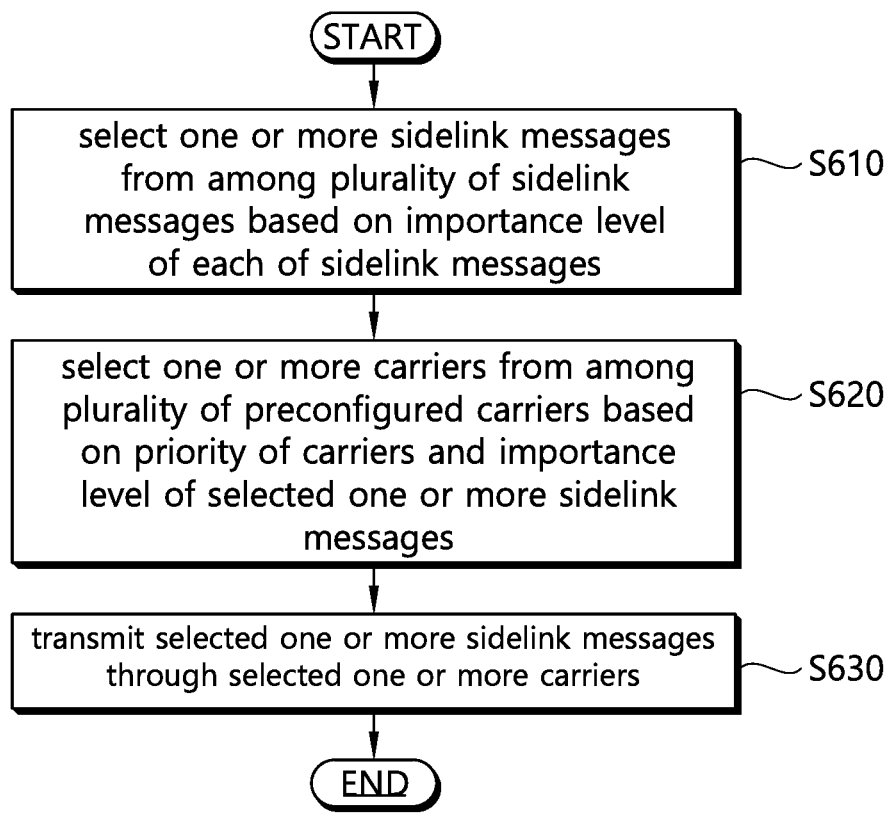
FIG. 6 illustrates a sidelink message transmission method of a UE according to an embodiment of the disclosure.

FIG. 6 illustrates a sidelink message transmission method of a UE according to an embodiment of the disclosure.

Referring to FIG. 6, the UE selects one or more sidelink messages from among a plurality of sidelink messages based on the importance level of each of the sidelink messages (S610). Here, the importance level of each of the sidelink messages may be such that a message including information on an object detected at a position relatively close to the UE has a high importance level. Further, the importance level of each of the sidelink messages may be such that a message including information having a relatively high confidence level with respect to a detected object has a high importance level. In addition, the importance level of each of the sidelink messages may be such that a message including information on a detected object having a relatively high detected object priority previously configured has a high importance level. Moreover, the importance level of each of the sidelink messages may be such that a message including information on a relatively large number of detected objects has a high importance level. Also, the importance level of each of the sidelink messages may be such that a message related to a service requiring relatively low latency (and/or a relatively high confidence level) (e.g., a message having a high ProSe per packet priority (PPPP)) has a high importance level.

The UE may select one or more carriers from among a plurality of carriers previously configured for the UE based on the priority of the carriers and the importance level of the selected one or more sidelink messages (S620). Here, the priority of the carriers may be such that a carrier on which UEs having limited reception capability commonly (or preferentially) perform a reception operation (or a carrier on which UEs having limited reception capability commonly have reception capability) has a high priority. Further, the priority of the carriers may be such that a carrier on which a different radio access technology (RAT) is less likely to exist or to be detected (or a carrier on which a different RAT is not detected) has a high priority. The priority of the carriers may be such that a carrier on which sidelink communication based on long-term evolution (LTE) is configured to have a relatively high communication priority has a high priority. The priority of the carriers may be such that a carrier on which a sidelink synchronization signal (SLSS) is transmitted (or a synchronization reference carrier (e.g., where transmission/reception-related (time/frequency) synchronization on a different carrier is derived from a synchronization source of a synchronization reference carrier previously configured)) has a high priority.

The UE transmits the selected messages through the selected carriers (S630). Here, a sidelink message having a relatively high importance level among the selected one or more sidelink messages may be preferentially transmitted through a carrier having a relatively high priority among the selected one or more carriers. Further, when the congestion level of the carrier having the relatively high priority among the selected one or more carriers is higher than a preset threshold, only the sidelink message having the relatively high importance level among the selected one or more messages may be transmitted through the carrier having the relatively high priority among the selected one or more carriers and a sidelink message having a relatively low importance level among the selected one or more messages may be transmitted through a carrier having a relatively low priority among the selected one or more carriers. The sidelink message having the relatively high importance level may include information coded with low resolution, while the sidelink message having the relatively low importance level may include additional information for increasing the resolution of the sidelink message having the relatively high importance level. When the congestion level of the carrier having the relatively high priority among the selected one or more carriers is lower than the preset threshold, all the selected one or more sidelink messages may be transmitted through the carrier having the relatively high priority among the selected one or more carriers regardless of the importance level.

Hereinafter, methods proposed in the disclosure are illustrated.

[Proposed method] For example, a UE to perform an operation of transmitting a V2X message (V2X transmission (TX) UE) may be allowed to select a transmission (TX) carrier (for message transmission) in consideration of the importance level of the message.

In one example, in a sensor sharing use case, a message having a (relatively) high importance level may be defined as a message including information on an object detected at a relatively close distance (/position) (and/or a message including information on a detected object having a (relatively) high confidence level and/or a message including information on a detected object having a high priority (or importance level) previously configured (/signaled) and/or a message including information on a relatively large number of detected objects).

The sensor sharing use case refers to, for example, a type of service in which a vehicle (or pedestrian) shares (/signals) attribute information (e.g., position, heading, speed, acceleration, confidence level, or the like) related to an object detected (by a camera/lidar) to a neighboring vehicle (or pedestrian) by broadcasting, thus enabling a vehicle (or pedestrian) to obtain a relatively wide range of sensing information having a high confidence level (in a cooperative manner).

In another example, a message having a (relatively) high importance level may be defined as a message related to a service having a relatively high reliability requirement (and/or a message related to a service having a relatively low latency requirement and/or a message related to a service having relatively long coverage requirement and/or an aperiodically generated message and/or a message related to a previously configured (/signaled) specific service (or a high-priority service)) and/or a message having a relatively high ProSe per packet priority (PPPP) value.

Here, in one example, the V2X TX UE may be allowed to preferentially (or necessarily (or according to a previously set (/signaled) period (/pattern/ratio))) perform an operation of transmitting a message having a relatively high importance level message on a carrier (having a relatively high priority) that satisfies the following conditions.

Example #1

Carrier previously configured (/signaled) for UEs having limited RX (chain) capability to (commonly or preferentially) perform reception (/monitoring) or carrier previously configured (/signaled) and having a (relatively) high (or specific) priority (e.g., even the UEs having the limited RX capability may be construed to (commonly) have reception (/monitoring) capability on this carrier). That is, there may be a carrier configured for the UEs having the limited RX capability to preferentially perform reception. For sidelink message transmission to these UEs, a high priority may be applied to the carrier.

Example #2

Carrier on which a relatively large number of UEs performing reception (/monitoring) (or transmission) concentrate (or carrier on which a relatively large number of UEs have RX capability). That is, the UE may apply a high priority to a carrier received by a relatively large number of UEs in order to perform transmission to a larger number of UEs.

Example #3

Carrier on which a different radio access technology (RAT) (previously configured (/signaled), e.g., dedicated short-range communication (DSRC)) is less likely to exist (or carrier on which a different RAT is not detected or carrier on which LTE V2X communication (/service) is configured as a high priority). That is, the carrier of Example #3 may be a carrier on which a different RAT does not exist or is less likely to exist. Here, in determining the existence of a different RAT on a specific carrier, the UE may measure energy in a preconfigured (time/frequency) resource (e.g., interpretable as a resource on which LTE V2X UEs do not perform transmission) on the specific carrier or may detect at least one of a preamble, a sequence, and a CP related to the different RAT (e.g., Wi-Fi), thereby determining whether the different RAT exists on the specific carrier. Here, the V2X UE may perform an energy measurement operation or an operation of detecting a signal (e.g., a preamble, a sequence, a CP, or the like) at least on a carrier on which the V2X UE performs transmission in order to determine whether a different RAT exists.

Example #4

Carrier on which transmission of a (high-importance) message by the V2X TX UE (or a message-related service) is configured as a high priority.

Example #5

Carrier having a relatively low index (or synchronization (synch) reference carrier (e.g., transmission on a different carrier may be performed based on a synch source (or time/frequency synchronization) of the synchronization reference carrier) or carrier having a (relatively) low (or high) congestion level). That is, the UE may transmit a message having a relatively high importance level via a carrier having a relatively low index, or may configure a carrier on which a sidelink synchronization signal (SLSS) is transmitted as a carrier having a relatively high priority and may preferentially transmit the message having the relatively high importance level through the carrier on which the SLSS is transmitted. Here, a V2X RX UE may be configured to preferentially (or commonly) receive the carrier on which the SLSS is transmitted, thus receiving the message having the relatively high importance level preferentially transmitted by the V2X TX UE.

That is, the V2X TX UE for which a plurality of carriers is preconfigured may select at least one of the plurality of preconfigured carriers in consideration of the importance level of a message to be transmitted by the V2X TX UE and a carrier priority and may transmit a message having a relatively high importance level through the selected carrier.

Figure 7:
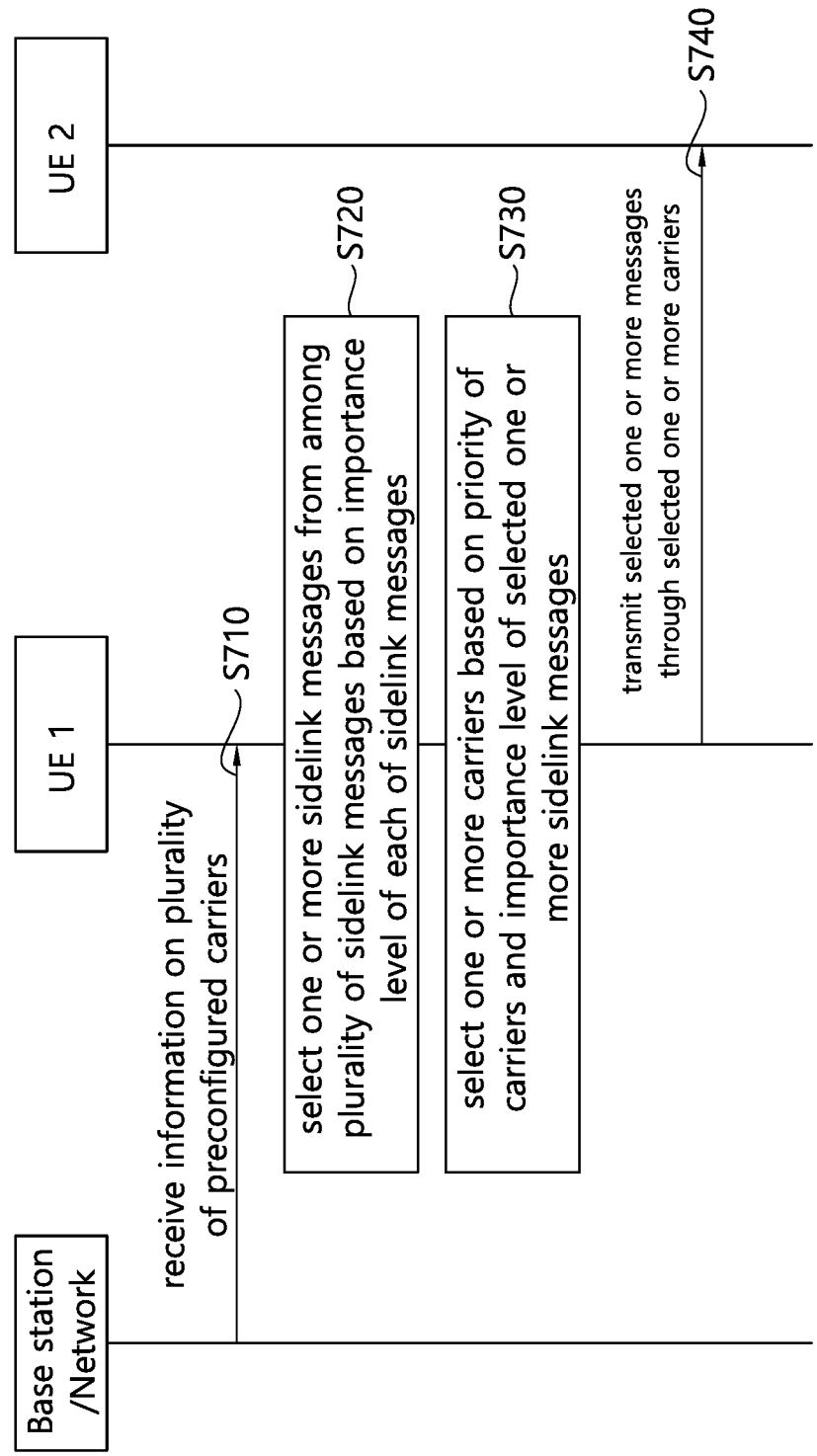
FIG. 7 illustrates a specific example of applying a sidelink message transmission method of a UE.

FIG. 7 illustrates a specific example of applying a sidelink message transmission method of a UE.

Referring to FIG. 7, UE 1 receives information on a plurality of carriers preconfigured for UE 1 from a base station or a network (S710). Here, the information may include information on the frequency position/band of the carriers and/or information on the priority of the carriers. Further, although not shown in FIG. 7, the information may be received through sidelink communication from a different UE including UE 2 in addition to the base station or the network.

UE 1 selects one or more sidelink messages from among a plurality of sidelink messages based on the importance level of each of the sidelink messages (S720). An embodiment related to the importance level of the sidelink messages may correspond to that illustrated above.

UE 1 selects one or more carriers based on the priority of the carriers and the importance level of the selected one or more sidelink messages (S730). An embodiment related to the priority of the carriers may correspond to that illustrated above.

UE 1 transmits the selected one or more messages to UE 2 through the selected one or more carriers (S740). An embodiment related to the transmission may correspond to that illustrated above.

Figure 8:
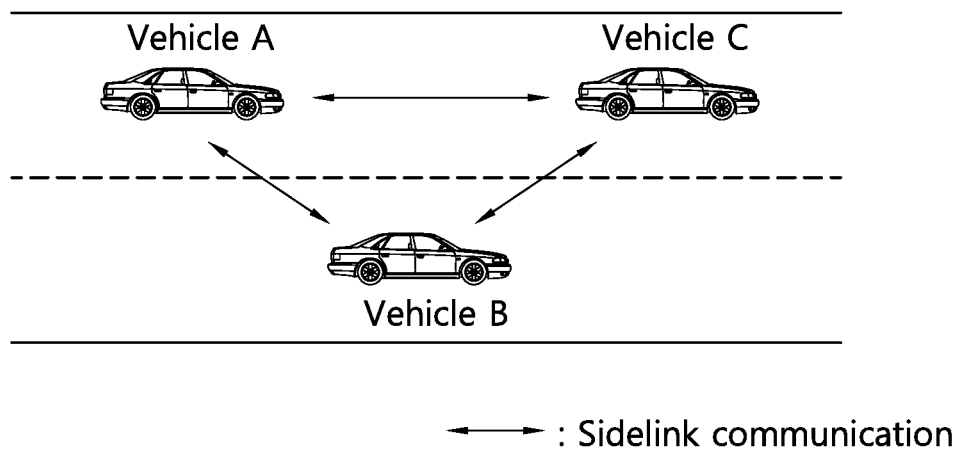
FIG. 8 illustrates an example of a scenario in which an embodiment of the disclosure can be implemented.

FIG. 8 illustrates an example of a scenario in which an embodiment of the disclosure can be implemented.

FIG. 8 shows that vehicle C is traveling at the head on a road, which is followed by vehicle B, which is finally followed by vehicle A. Vehicle A, vehicle B, and vehicle C may be capable of wireless communication, such as side link communication, therebetween.

Here, for example, the confidence level of information on vehicle B among information detected/sensed by vehicle C may be higher than the confidence level of information on vehicle A. Vehicle C may transmit the information on vehicle B and the information about vehicle A to other neighboring vehicles. Vehicle C may transmit the information on vehicle B, which is information having a relatively high confidence level, through a carrier having a relatively high priority and may transmit the information on vehicle A, which is information having a relatively low confidence level, through a carrier having a relatively low priority. The carrier having the relatively high priority may correspond to the carrier illustrated above in Example #1 to Example #5.

In another example, the V2X TX UE may be allowed to: transmit all information (/messages) through a primary carrier regardless of the importance level of a message (or priority) when the congestion level of the primary carrier previously configured (/signaled) is low (lower than a threshold previously configured (/signaled)); and transmit a message having a (relatively) high importance level through the primary carrier and transmit a message having a (relatively) low importance level through a secondary carrier when the congestion level of the primary carrier is high (higher than the threshold previously configured (/signaled)).

Here, in one example, the primary carrier (or secondary carrier) may be interpreted as the carrier having the (relatively) high (or low) priority illustrated above (e.g., in Example #1 to Example #5). That is, the primary carrier may be a carrier having a relatively high priority among selected carriers, and the secondary carrier may be a carrier having a relatively low priority compared to the primary carrier.

Here, in one example, the primary carrier and the secondary carrier may be interpreted as carriers mapped (/linked) to the same service (e.g., in a one-to-many service-carrier mapping relationship).

In a see-through case as a specific example to which the foregoing rules are (entirely or partly) applied, when congestion occurs in the primary (/prioritized) carrier, it is possible (for the V2X TX UE) to perform transmission via coding with low resolution while obtaining additional resolution through data transmitted via the secondary carrier. In this case, minimum performance may be guaranteed once a UE having limited RX capability performs reception on the primary (/prioritized) carrier (e.g., interpreted as a carrier previously configured (/signaled) for UEs having limited RX (chain) capability to (commonly or preferentially) perform reception (/monitoring)). The see-through case or see-through service may mean, for example, that a vehicle provides a function of sharing a camera image about the condition of a road ahead of the vehicle with other following vehicles.

That is, the V2X TX UE may transmit information on the condition of a road ahead thereof to a V2X RX UE following the V2X TX UE. In this case, when a plurality of carriers is previously configured for the UEs and congestion occurs in the primary carrier, the V2X TX UE may transmit information having a relatively high importance level through the primary carrier and may transmit information having a relatively low importance level through the secondary carrier. For example, the information having the relatively high importance level may be information obtained by coding road information detected by the V2X TX UE with low resolution, and the information having the relatively low importance level may be supplementary information needed to reconstruct the information coded with the low resolution to high resolution. Accordingly, the V2X RX UE may receive at least information having a high importance level through the primary carrier according to the RX capability of the RX UE, and thus the UE having the limited RX capability can use the see-through service even when congestion occurs in the primary carrier. Here, the primary carrier may be a carrier having a relatively high priority, and the secondary carrier may be a carrier having a relatively low priority.

Figure 9:
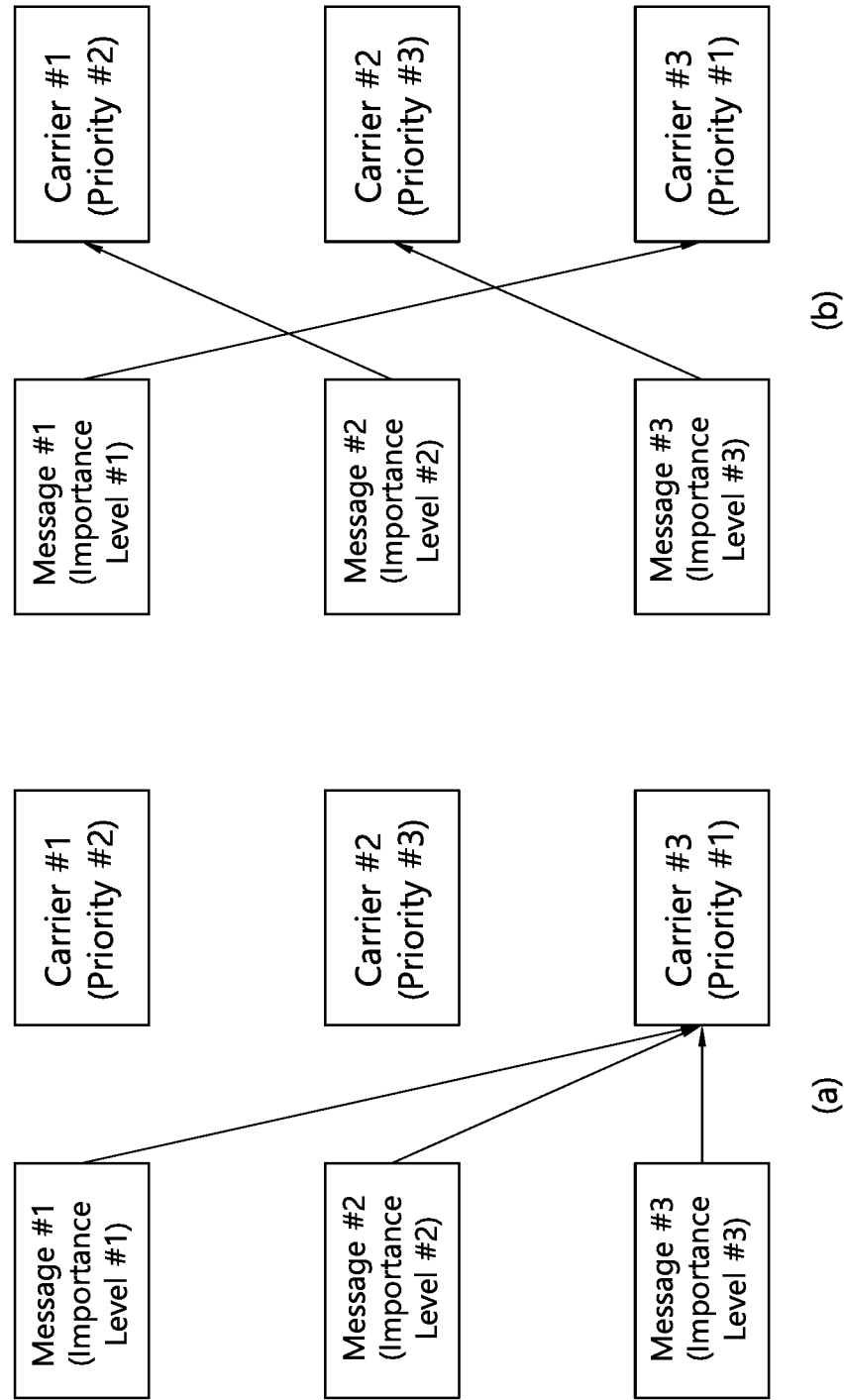
FIG. 9 schematically illustrates an example to which the foregoing sidelink message transmission method of the UE is applied.

FIG. 9 schematically illustrates an example to which the foregoing sidelink message transmission method of the UE is applied. FIG. 9 is for illustration only, and the disclosure may be applied to various message transmission methods to which in addition to the example of FIG. 9.

Referring to FIG. 9, three carriers of carrier #1, carrier #2, and carrier #3 are configured for a UE, and the UE has three messages of message #1, message #2, and message #3 to be transmitted.

The importance levels of the messages may be in order of message #1, message #2, and message #3. The priorities of the carriers configured for the UE may be in order of carrier #3, carrier #1, and carrier #2.

When the congestion level of carrier #3, which has the highest priority, is lower than a preset threshold, the UE may select all messages as messages to be transmitted and may transmit all messages through carrier #3 having the highest priority as shown in (a) of FIG. 9. The UE may sequentially transmit the selected messages through carrier #3 in order of importance levels from the highest.

When the congestion level of carrier #3, which has the highest priority, is greater than the preset threshold, the UE may select all messages as messages to be transmitted, may transmit message #1 having the highest importance level through carrier #3 having the highest priority, may transmit message #2 having the next highest importance level through carrier #1 having the next highest priority, and may transmit message #3 having the lowest importance level through carrier #2 having the lowest priority.

Figure 10:
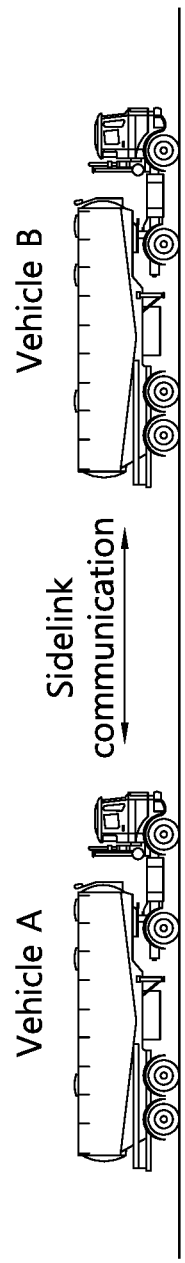
FIG. 10 illustrates an example in which the disclosure is applied to the foregoing see-through service.

FIG. 10 illustrates an example in which the disclosure is applied to the foregoing see-through service.

FIG. 10 illustrates an example in which the see-through service is applicable, in which vehicle B is traveling ahead and vehicle A is traveling immediately after vehicle B. Here, vehicle A and vehicle B may be vehicles capable of wireless communication, such as a sidelink operation.

Referring to FIG. 10, when vehicle B transmits information (e.g., information on a road ahead of vehicle B) detected by vehicle B to vehicle A, vehicle B may transmit the information through a plurality of preconfigured carriers.

Vehicle B may transmit the information through a carrier having a relatively high priority. However, when congestion occurs in the carrier having the relatively high priority, vehicle B may transmit information having a relatively high importance level among the information through the carrier having the relatively high priority and may transmit information having a relatively low importance level through a carrier having a relatively low priority. Alternatively, when congestion occurs in the carrier having the relatively high priority, vehicle B may code the information on the road detected by vehicle B with low resolution and may transmit the road information through the carrier having the relatively high priority and may transmit information needed to reconstruct/decode the information coded with the low resolution into high resolution through the carrier having the relatively low priority. The carrier having the relatively high priority may be a primary carrier, and the carrier having the relatively low priority may be a secondary carrier.

Here, when congestion occurs in the primary carrier or when vehicle A is a vehicle with limited RX capability, vehicle A may receive only information having a relatively high importance level among pieces of information transmitted by vehicle B through the primary carrier. That is, vehicle A may receive only information obtained by coding the information on the road with low resolution, thus identifying the information on the road ahead of vehicle B with a relatively low image quality. When vehicle A has no limitation in RX capability or can perform reception through a plurality of carriers, vehicle A may receive all the pieces of information transmitted by vehicle B through the primary carrier and the secondary carrier, thus identifying the information on the road ahead of vehicle B with a relatively high image quality compared to that received only through the primary carrier.

Figure 11:
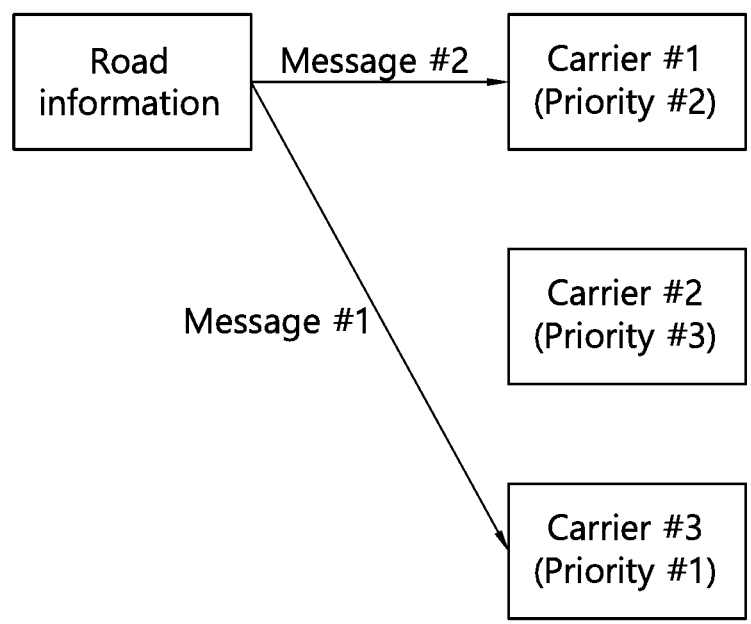
FIG. 11 schematically illustrates an example in which the disclosure is applied to the foregoing see-through service.

FIG. 11 schematically illustrates an example in which the disclosure is applied to the foregoing see-through service.

Referring to FIG. 11, when a UE transmits information detected by the UE to a different UE, the UE may transmit the information using a plurality of preconfigured carriers. The UE may be vehicle B illustrated above in FIG. 10, and the different UE may be vehicle A illustrated above in FIG. 10.

Here, when carrier #1, carrier #2, and carrier #3 are previously configured for the UE, the priorities of the carriers may be in order of carrier #3, carrier #1, and carrier #2.

The UE may transmit the information detected by the UE through carrier #3 having the highest priority. However, when congestion occurs in carrier #3, the UE may divide the information into message #1 and message #2 and may transmit message #1 and message #2 through different carriers. Message #1 may be a message obtained by coding road information with low resolution, and message #2 is a supplementary message of message #1 for increasing the resolution of the road information with the low resolution included in message #1. Message #1 may be transmitted through carrier #3, which has the highest priority, and message #2 may be transmitted through carrier #1, which has a relatively low priority.

Therefore, according to the disclosure, when a UE for which a plurality of carriers is previously configured performs sidelink transmission, the UE may transmit a message through a carrier having the highest priority according to the priority of a carrier and the importance level of a message to be transmitted or may transmit a message having a relatively high importance level through a carrier having a relatively high priority, thereby performing efficient sidelink communication, for example, by avoiding a carrier having a high congestion level or a carrier used for a different radio communication technology according to the importance level of a message to be transmitted by the UE.

Further, when the UE that performs sidelink transmission has limited TX capability or when the UE that performs sidelink reception has limited RX capability, the UE may preferentially transmit/receive a message having a relatively high importance level under the limited TX/RX capability, thus increasing the accuracy and efficiency of sidelink communication.

For example, when the proposed methods are applied, even a UE having limited RX (chain) capability can efficiently (or reliably) receive a message having a relatively high importance level (e.g., even the UE having the limited RX (chain) capability can efficiently receive sensing information about a surrounding object (/environment) (having a high importance level in the sensor sharing use case).

It is obvious that examples of the proposed methods described above may also be included as methods for implementing the disclosure and may thus be regarded as proposed methods. The proposed methods described above may be independently implemented, or some of the proposed methods may be combined (or merged) to be implemented.

For example, the proposed methods of the disclosure have been described based on a 3GPP LTE system for convenience of description, but the proposed methods may also be extendedly applied to other systems in addition to the 3GPP LTE system.

For example, the proposed methods of the disclosure may be extendedly applied to device-to-device (D2D) communication.

D2D communication refers to, for example, direct communication between a communication device and a different communication device via a wireless channel, where the communication device refers to, for example, a user terminal but a network equipment, such as a base station, transmitting/receiving a signal according to a communication mode between communication devices may also be regarded as a type of communication device.

In one example, the proposed methods of the disclosure may be limitedly applied only to a V2X operation in Mode #3 (and/or V2X operation in Mode #4).

Also, in one example, the proposed methods of the disclosure may be limitedly applied only to previously configured (/signaled) (specific) V2X channel (/signal) transmission (e.g., PSSCH (and/or (linked) PSCCH and/or PSBCH)).

Further, in one example, the proposed methods of the disclosure may be limitedly applied only when a PSSCH and a (linked) PSCCH are adjacently (and/or non-adjacently) transmitted (in a frequency domain) (and/or when transmission based on a previously configured (/signaled) modulation and coding scheme (MCS) (and/or coding rate and/or resource block (RB)) (value (/range)) is performed).

Moreover, in one example, the proposed methods of the disclosure may be limitedly applied only to V2X carriers in Mode #3 (and/or Mode #4) (and/or carriers for sidelink (/uplink) semi-persistent scheduling (SPS) (in Mode #4 (/3)) (and/or SL (/UL) dynamic scheduling)).

In addition, in one example, the proposed methods of the disclosure may be (limitedly) applied only when the positions and/or the numbers of synchronization signal (transmission (and/or reception)) resources (and/or the positions and/or the numbers of V2X resource pool-related subframes (and/or the sizes and/or the numbers of subchannels)) in carriers are the same (and/or (partly) different).

Furthermore, in one example, the proposed methods of the disclosure may be (limitedly) applied only when services and carriers have a one-to-many (and/or many-to-one) mapping relationship.

Figure 12:
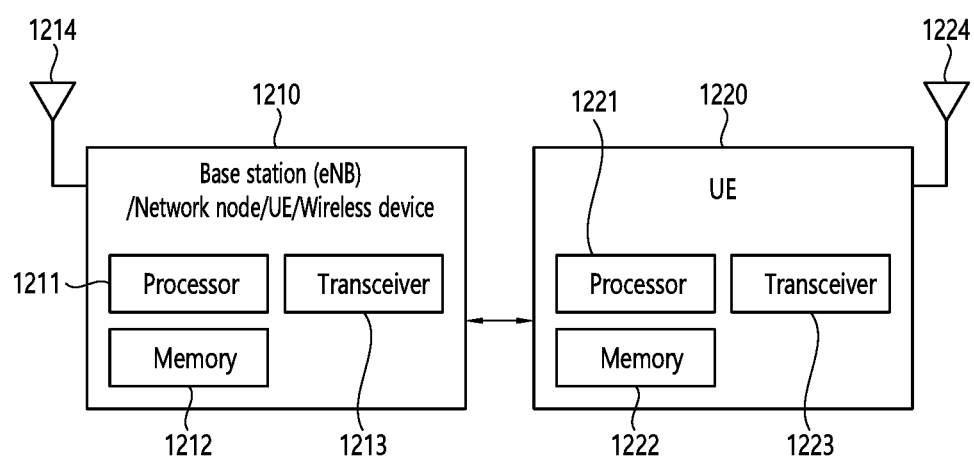
FIG. 12 is a block diagram illustrating an example of a wireless communication device according to an embodiment of the disclosure.

FIG. 12 is a block diagram illustrating an example of a wireless communication device according to an embodiment of the disclosure.

Referring to the example of FIG. 12, a wireless communication system may include a base station 1210 and a UE 1220. The UE 1220 may be located within an area of the base station 1210. In some scenarios, the wireless communication system may include a plurality of UEs. Although the example of FIG. 12 illustrates the base station 1210 and the UE 1220, the disclosure is not limited thereto. For example, the base station 1210 may be replaced with a network node, a UE, a wireless device, or an equivalent thereof.

Each of the base station and the UE may represent a wireless communication device or a wireless device. In FIG. 12, the base station may be replaced with a network node, a wireless device, or a UE.

The base station 1210 includes at least one processor including a processor 1211, at least memory including a memory 1212, and at least transceiver including transceiver 1213. The processor 1211 performs the functions, procedures, and/or methods illustrated in FIG. 6 to FIG. 11. The processor 1211 may perform one or more protocols. For example, the processor 1211 may perform one or more layers (e.g., a functional layer) of a radio interface protocol. The memory 1212 is connected to the processor 1211 and stores various types of information and/or commands. The transceiver 1213 is connected to the processor 1211 and may be controlled to transmit and receive a radio signal.

The UE 1220 includes at least one processor including a processor 1221, at least one memory device including a memory 1222, and at least one transceiver including a transceiver 1223.

The processor 1221 performs the functions, procedures, and/or methods illustrated in FIG. 6 to FIG. 11. The processor 1221 may perform one or more protocols. For example, the processor 1221 may perform one or more layers (e.g., a functional layer) of a radio interface protocol. The memory 1222 is connected to the processor 1221 and stores various types of information and/or commands. The transceiver 1223 is connected to the processor 1221 and may be controlled to transmit and receive a radio signal.

The memory 1212 and/or memory 1222 may be internally or externally connected to the processor 1211 and/or the processor 1221 and may be connected to a different processor through various techniques, such as a wired or wireless connection.

The base station 1210 and/or the UE 1220 may have one or more antennas. For example, an antenna 1214 and/or an antenna 1224 may be configured to transmit and receive a radio signal.

Figure 13:
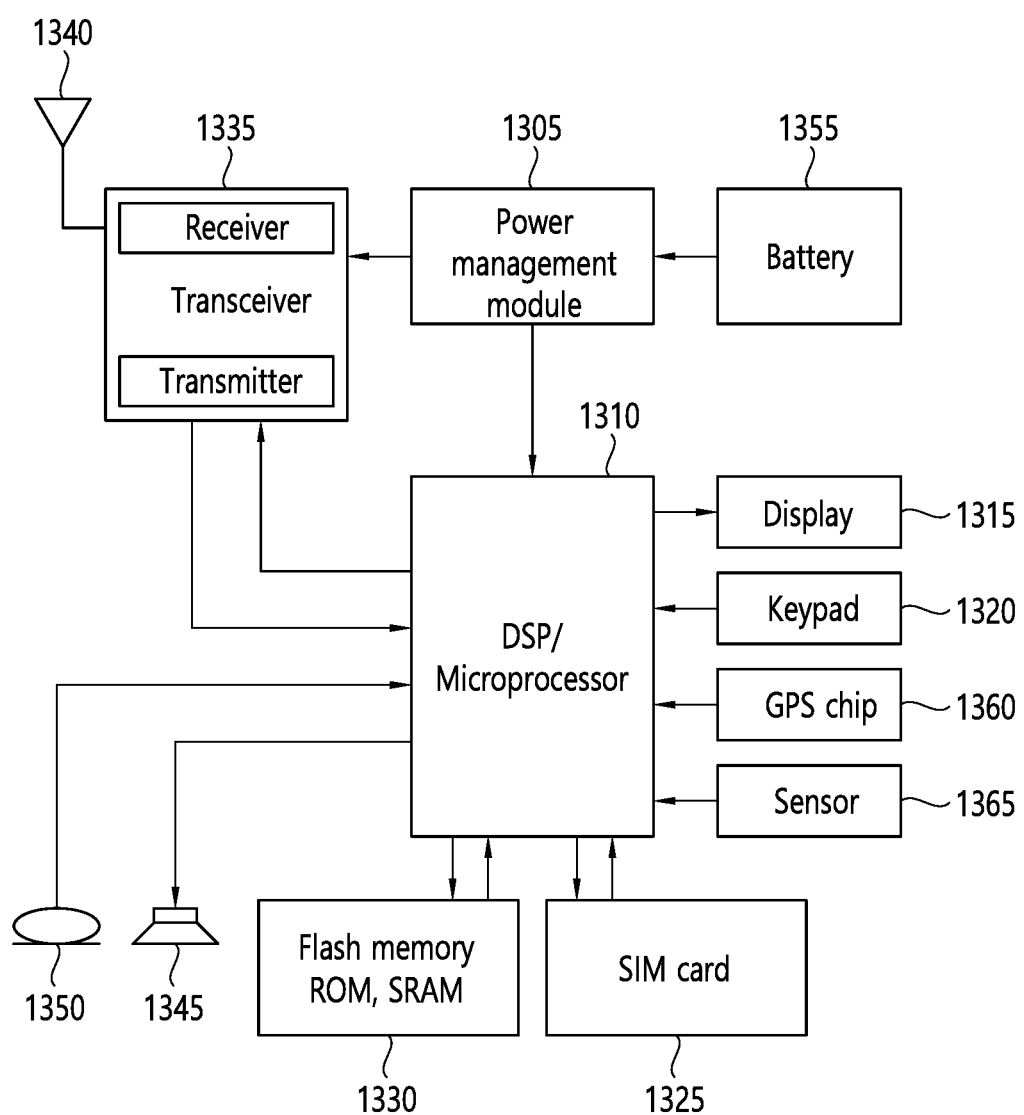
FIG. 13 illustrates an example of a wireless communication device to implement an embodiment of the disclosure.

FIG. 13 illustrates an example of a wireless communication device to implement an embodiment of the disclosure.

Specifically, FIG. 13 illustrates an example of the UE 1220 of FIG. 12 in detail. The UE may be any suitable mobile computer device configured to perform one or more embodiments of the disclosure, for example, a vehicular communication system or device, a wearable device, a portable computer, a smartphone, or the like.

Referring to the example of FIG. 13, the UE may include at least one processor (e.g., a DSP or a microprocessor), such as a processor 1310, a transceiver 1335, a power management module 1305, an antenna 1340, a battery 1355, a display 1315, a keypad 1320, a global positioning system (GPS) chip 1360, a sensor 1365, a memory 1330, a subscriber identity module (SIM) card 1325 (optional), a speaker 1345, and a microphone 1350. The UE may include one or more antennas.

The processor 1310 may be configured to perform the functions, procedures, and/or methods illustrated in FIG. 6 to FIG. 11 of the disclosure. According to an embodiment, the processor 1310 may perform one or more protocols, such as layers (e.g., functional layers) of a radio interface protocol.

The memory 1330 is connected to the processor 1310 and stores information related to the operation of the processor. The memory may be disposed inside or outside the processor and may be connected to a different processor through various techniques, such as a wired or wireless connection.

A user may input various types of information (e.g., command information, such as a phone number) using various techniques, for example, pressing buttons on the keypad 1320 or voice activation using the microphone 1350. The processor receives and processes information from the user and performs an appropriate function, such as dialing a phone number. In one example, data (e.g., operational data) may be retrieved from the SIM card 1325 or the memory 1330 to perform functions. In another example, the processor may receive and process GPS information from the GPS chip 1360 to perform a function related to the position of the device, such as a vehicle navigation system and a map service. In still another example, the processor may display various types of information and data on the display 1315 for the user's reference or convenience.

The transceiver 1335 is connected to the processor, and transmits and receives a radio signal, such as a radio frequency (RF) signal. The processor may control the transceiver to initiate communication and to transmit a radio signal including various types of information or data, such as voice communication data. The transceiver includes one receiver and one transmitter to transmit and receive a radio signal. The antenna 1340 facilitates transmission and reception of radio signals. According to an embodiment, in receiving radio signals, the transceiver may forward and convert the signals into baseband frequencies to process the signals using the processor. The processed signals may be processed according to various techniques, for example, to be converted into audible information for output through the speaker 1345 or into readable information.

According to an embodiment, the sensor 1365 may be connected to the processor. The sensor may include one or more sensing devices configured to discover various types of information, including, but not limited to, speed, acceleration, light, vibrations, proximity, a position, an image, and the like. The processor may receive and process sensor information obtained from the sensor and may perform various types of functions, such as collision avoidance and autonomous driving.

In the example of FIG. 13, various components (e.g., a camera, a USB port, or the like) may be further included in the UE. For example, the camera may be connected to the processor and may be used for various services, such as autonomous driving, a vehicle safety service, and the like.

FIG. 13 illustrates merely an example of a UE, and an embodiment is not limited thereto. For example, some components (e.g., the keypad 1320, the GPS chip 1360, the sensor 1365, the speaker 1345, and/or the microphone 1350) may not be configured in some scenarios.

Figure 14:
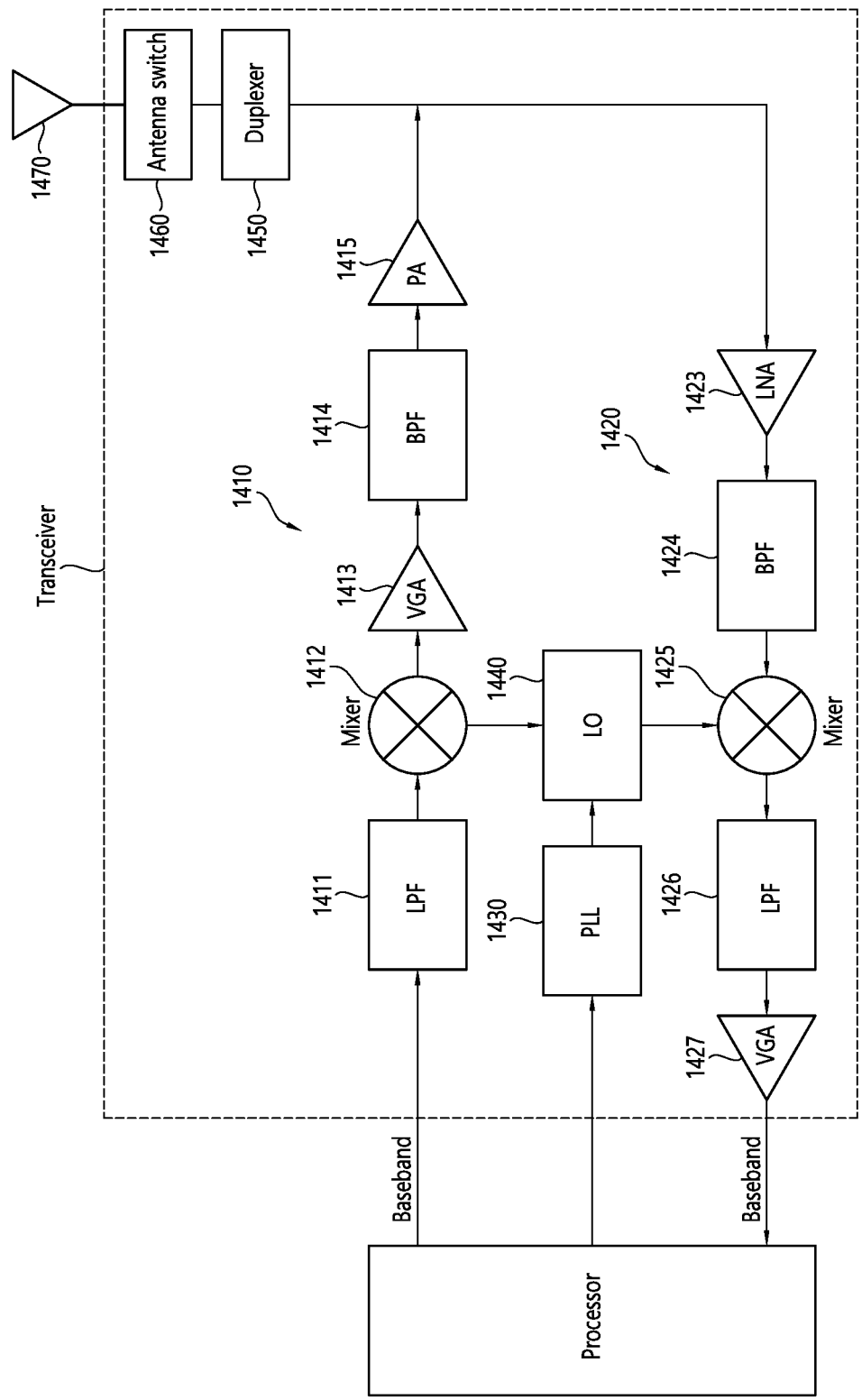
FIG. 14 illustrates an example of a transceiver of a wireless communication device according to an embodiment of the disclosure.

FIG. 14 illustrates an example of a transceiver of a wireless communication device according to an embodiment of the disclosure.

Specifically, FIG. 14 illustrates an example of a transceiver that may be configured in a frequency division duplex (FDD) system.

On a transmission path, at least one processor, such as the processors illustrated in FIG. 12 and FIG. 13, may process data to be transmitted and may transmit a signal, such as an analog output signal, to a transmitter 1410.

In this example, in the transmitter 1410, the analog output signal is filtered by a low-pass filter (LPF) 1411 to remove noise due to, for example, previous digital-to-analog conversion (ADC), is upconverted by an upconverter (e.g., a mixer) 1412 from a baseband to an RF, and is amplified by an amplifier, such as a variable-gain amplifier (VGA) 1413. The amplified signal is filtered by a filter 1414, is amplified by a power amplifier (PA) 1415, is routed through a duplexer(s) 1450/antenna switch(s) 1460, and is transmitted through an antenna 1470.

On a reception path, the antenna 1470 receives a signal in a wireless environment, and the received signal is routed by the antenna switch(s) 1460/duplexer(s) 1450 and is transmitted to a receiver 1420.

In this example, the signal received by the receiver 1420 is amplified by an amplifier, such as a low-noise amplifier (LNA) 1423, is filtered by a band-pass filter 1424, and is downconverted by a downconverter (e.g., a mixer) 1425 from an RF to a baseband.

The downconverted signal is filtered by a low-pass filter (LPF) 1426 and is amplified by an amplifier, such as a VGA 1427, to obtain an analog input signal, and the analog input signal is provided to at least one processor, such as the processors illustrated in FIG. 12 and FIG. 13.

Further, a local oscillator (LO) 1440 causes transmission and reception of an LO signal to transmit the LO signal to the upconverter 1412 and the downconverter 1425.

In some embodiments, a phase-locked loop (PLL) 1430 may receive control information from the processor and may transmit control signals to the LO 1440 to generate LO signals to be transmitted and received at an appropriate frequency.

Embodiments are not limited to a specific arrangement illustrated in FIG. 14, and various components and circuits may be arranged differently from those in the example illustrated in FIG. 14.

Figure 15:
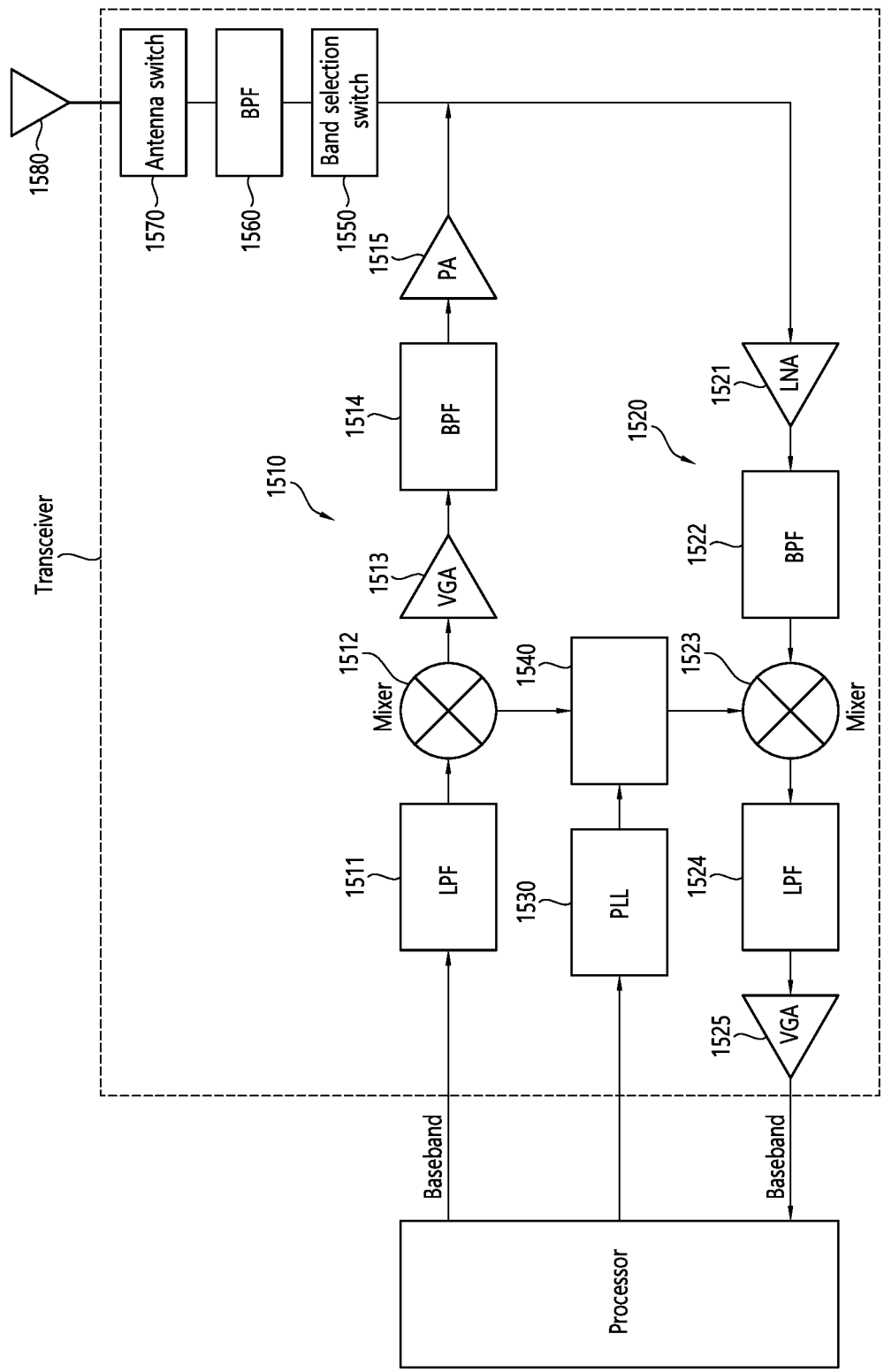
FIG. 15 illustrates another example of a transceiver of a wireless communication device according to an embodiment of the disclosure.

FIG. 15 illustrates another example of a transceiver of a wireless communication device according to an embodiment of the disclosure.

Specifically, FIG. 15 illustrates an example of a transceiver that may be configured in a time division duplex (TDD) system.

According to an embodiment, a transmitter 1510 and a receiver 1520 of the transceiver of the TDD system may have one or more similar features to those of the transmitter and the receiver of the transceiver of the FDD system.

Hereinafter, a structure of the transceiver of the TDD system will be described.

On a transmission path, a signal amplified by a power amplifier (PA) 1515 of the transmitter is routed through a band selection switch 1550, a band-pass filter (BPF) 1560, and an antenna switch(s) 1570 and is transmitted to an antenna 1580.

On a reception path, the antenna 1580 receives signals in a wireless environment, and the received signals are routed through the antenna switch(s) 1570, the BPF 1560, and the band selection switch 1550 and are transmitted to the receiver 1520.

Figure 16:
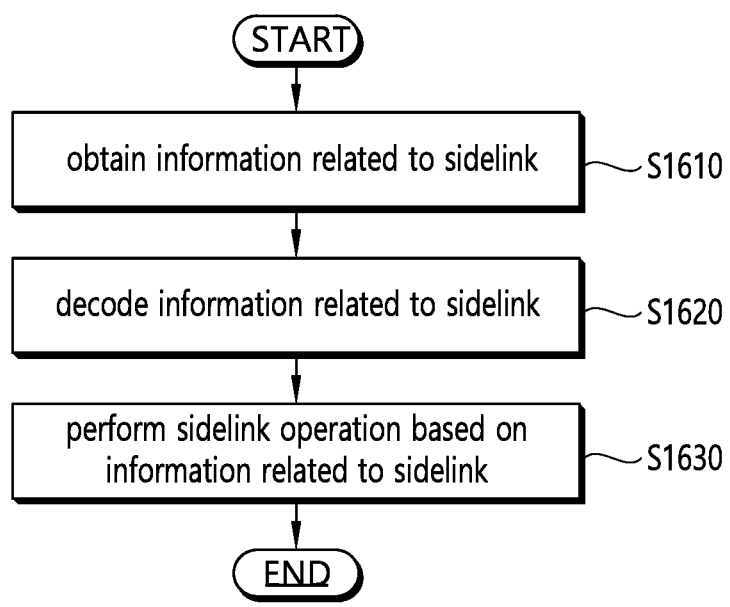
FIG. 16 illustrates an example of an operation of a wireless device related to sidelink communication.

FIG. 16 illustrates an example of an operation of a wireless device related to sidelink communication. The operation of the wireless device related to a sidelink described in FIG. 16 is merely an example, and sidelink operations using various techniques may be performed by the wireless device. A sidelink is a UE-to-UE interface for sidelink communication and/or sidelink discovery. A sidelink may correspond to a PC5 interface. In a broad sense, a sidelink operation may be transmission and reception of information between UEs. A sidelink may carry various types of information.

In this example, the wireless device obtains information related to a sidelink (S1610). The information related to the sidelink may be one or more resource configurations. The information related to the sidelink may be obtained from a different wireless device or a network node.

After obtaining the information, the wireless device decodes the information related to the sidelink (S1620).

After decoding the information related to the sidelink, the wireless device performs one or more sidelink operations based on the information related to the sidelink (S1630). Here, the sidelink operation(s) performed by the wireless device may be one or more operations described herein.

Figure 17:
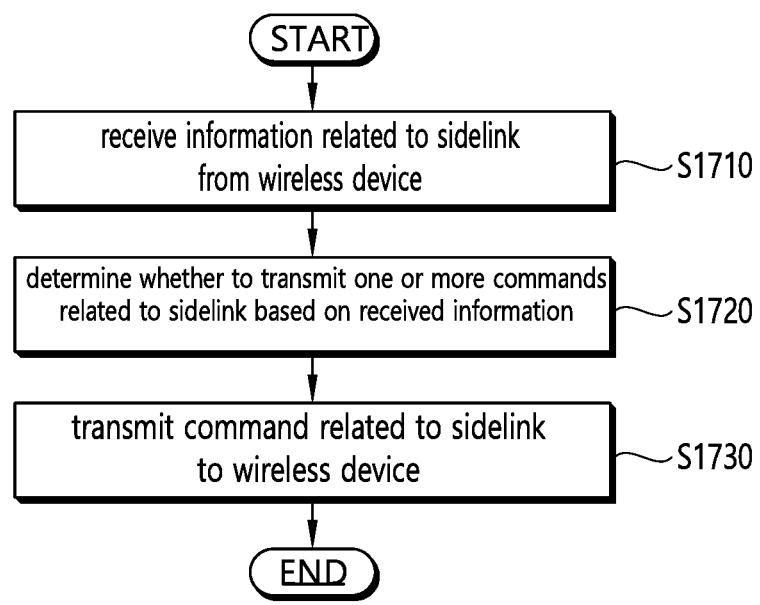
FIG. 17 illustrates an example of an operation of a network node related to a sidelink.

FIG. 17 illustrates an example of an operation of a network node related to a sidelink. The operation of the network node related to the sidelink described in FIG. 17 is merely an example, and sidelink operations using various techniques may be performed by the network node.

The network node receives information related to a sidelink from a wireless device (S1710). For example, the information related to the sidelink may be SidelinkUEInformation used to report sidelink information to the network node.

After receiving the information, the network node determines whether to transmit one or more commands related to the sidelink based on the received information (S1720).

When the network node determines to transmit a command, the network node transmits the command(s) related to the sidelink to the wireless device (S1730). According to an embodiment, after receiving the command transmitted by the network node, the wireless device may perform one or more sidelink operation(s) based on the received command.

Figure 18:
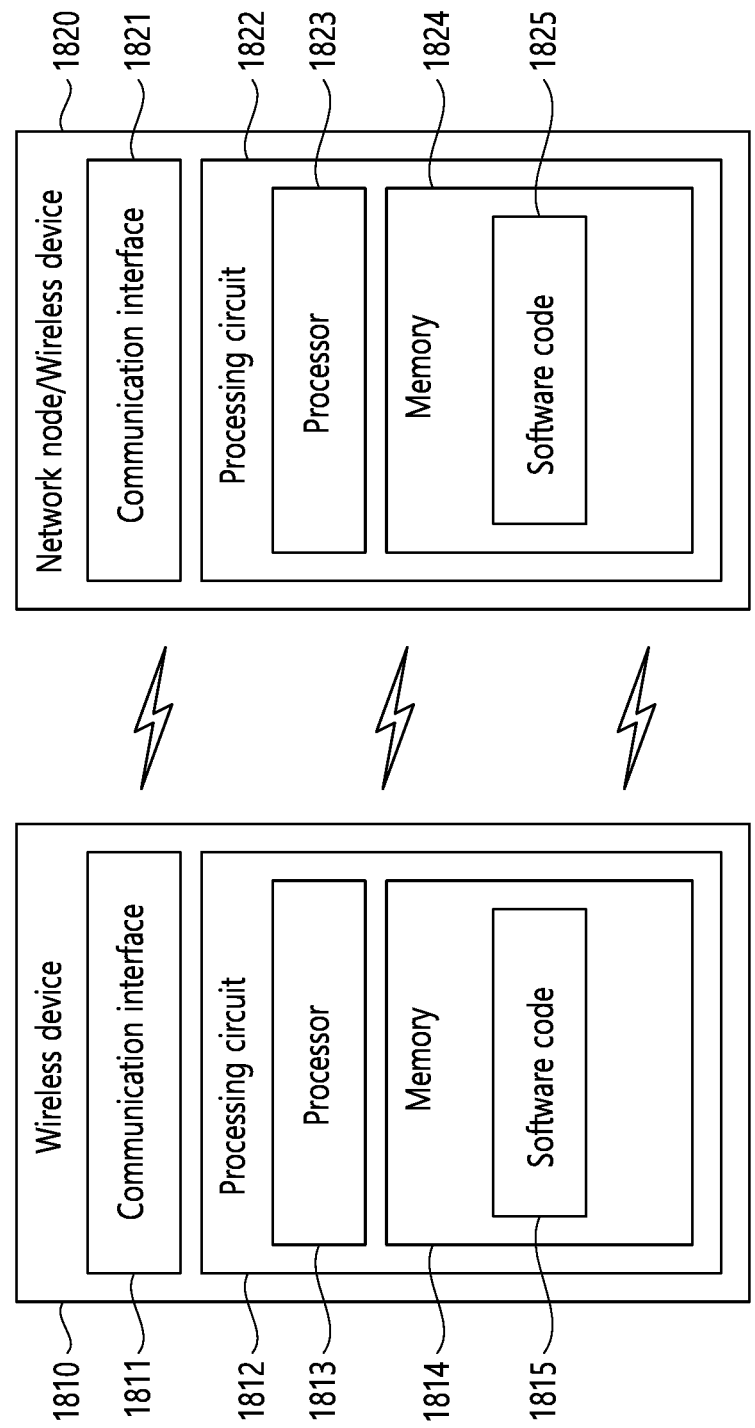
FIG. 18 is a block diagram illustrating an example of communication between a wireless device 1810 and a network node 1820.

FIG. 18 is a block diagram illustrating an example of communication between a wireless device 1810 and a network node 1820. The network node 1820 may be replaced with a wireless device or a UE of FIG. 18.

In this example, the wireless device 1810 includes a communication interface 1811 to communicate with one or more other wireless devices, network nodes, and/or other elements within a network. The communication interface 1811 may include one or more transmitters, one or more receivers, and/or one or more communication interfaces. The wireless device 1810 includes a processing circuit 1812. The processing circuit 1812 may include one or more processors, such as a processor 1813, and one or more memories, such as a memory 1814.

The processing circuit 1812 may be configured to control any of the methods and/or processes described herein and/or to allow, for example, the wireless device 1810 to perform the methods and/or processes. The processor 1813 corresponds to one or more processors to perform the functions of the wireless device described herein. The wireless device 1810 includes the memory 1814 configured to store data, a program software code, and/or other information described herein.

In one or more embodiments, the memory 1814 may be configured to store a software code 1815 including a command which, when executed by the one or more processors, such as the processor 1813, causes the processor 1813 to perform some or all of processes discussed in detail with respect to FIG. 16 and an embodiment discussed herein.

For example, the one or more processors, such as the processor 1813, that manipulate one or more transceivers, such as the transceiver 1223 of FIG. 12, to transmit and receive information may perform one or more processes related to transmission and reception of information.

The network node 1820 includes a communication interface 1821 to communicate with one or more other network nodes, wireless devices, and/or other elements in the network. The communication interface 1821 includes one or more transmitters, one or more receivers, and/or one or more communication interfaces. The network node 1820 includes a processing circuit 1822. The processing circuit includes a processor 1823 and a memory 1824.

In various embodiments, the memory 1824 may be configured to store a software code 1825 including a command which, when executed by the one or more processors, such as the processor 1823, causes the processor 1823 to perform some or all of processes discussed in detail with respect to FIG. 17 and an embodiment discussed herein.

For example, the one or more processors, such as the processor 1823, that manipulate one or more transceivers, such as the transceiver 1213 of FIG. 12, to transmit and receive information may perform one or more processes related to transmission and reception of information.

What is claimed is:

1. A method for transmitting a plurality of sidelink messages in a wireless communication system, the method performed by a user equipment (UE) configured with a plurality of carriers including a first carrier and a second carrier, the method comprising:
    selecting the first carrier and the second carrier based on priorities of the plurality of carriers, wherein a priority of a carrier is determined based on a number of UEs to receive the carrier,
    measuring a congestion level of the first carrier, wherein the congestion level measured for the first carrier in subframe n, wherein n is an integer, is a portion of sub-channels in a resource pool whose Sidelink Received Signal Strength Indicator (S-RSSI) measured by the UE exceeds a configured threshold sensed over subframes [n-100, n-1],
    and wherein the S-RSSI is defined as a linear average of a total received power per Single Carrier Frequency Division Multiple Access (SC-FDMA) symbol observed by the UE only in a configured sub-channel in SC-FDMA symbols 1, 2, 3, 4, 5 and 6 of a first slot and SC-FDMA symbols 0, 1, 2, 3, 4 and 5 of a second slot of a subframe,
    based on the congestion level being greater than a congestion threshold, transmitting (1) first sidelink control information (SCI) and a first sidelink message based on the first SCI among the plurality of sidelink messages through the first carrier and (2) second SCI and a second sidelink message based on the second SCI among the plurality of sidelink messages through the second carrier, wherein each of the first SCI and the second SCI comprises i) a priority field, ii) a resource reservation field, iii) a frequency resource location of initial transmission and retransmission field, iv) a time gap between initial transmission and retransmission field, v) a modulation and coding scheme (MCS) field, vi) a retransmission index field, and vii) reserved information bits, and
    based on the congestion level being lower than the congestion threshold, transmitting the first SCI, the first sidelink message, the second SCI and the second sidelink message through the first carrier,
    wherein the first carrier and the second carrier are pre-configured by a network,
    wherein an importance level of the first sidelink message is higher than an importance level of the second sidelink message, and
    wherein the first sidelink message includes sensing information with minimum resolution performance supported, and the second sidelink message includes assistance information for increasing a resolution of the sensing information.

2. The method of claim 1, wherein the UE communicates with at least one of a mobile terminal, a network or autonomous vehicles other than the UE.

3. The method of claim 1, wherein the importance level of each of the plurality of sidelink messages is further determined based on a number of detected objects.

4. The method of claim 3, wherein the importance level is increased based on the number of the detected objects being increased.

5. The method of claim 1, wherein the first carrier and the second carrier are mapped to a same service.

6. The method of claim 1, wherein the importance level of each of the plurality of sidelink messages is further determined based on a priority of information related to a detected object included in each of the plurality of sidelink messages, and the priority of the information is predetermined by the network.

7. The method of claim 1, wherein the congestion threshold is predetermined by the network.

8. The method of claim 1, wherein the UE receives information from the network informing the UE of the first carrier and the second carrier.

9. The method of claim 1, wherein the first carrier is a carrier sensed by a greatest number of UEs among the plurality of carriers.

10. A user equipment (UE) configured with a plurality of carriers including a first carrier and a second carrier, the UE comprising:
    a transceiver configured for transmitting and receiving a radio signal; and
    a processor operatively coupled with the transceiver, wherein the processor is configured to:
    select the first carrier and the second carrier based on priorities of the plurality of carriers, wherein a priority of a carrier is determined based on a number of UEs to receive the carrier,
    measure a congestion level of the first carrier, wherein the congestion level measured for the first carrier in subframe n, wherein n is an integer, is a portion of sub-channels in a resource pool whose Sidelink Received Signal Strength Indicator (S-RSSI) measured by the UE exceeds a configured threshold sensed over subframes [n-100, n-1],
    and wherein the S-RSSI is defined as a linear average of a total received power per Single Carrier Frequency Division Multiple Access (SC-FDMA) symbol observed by the UE only in a configured sub-channel in SC-FDMA symbols 1, 2, 3, 4, 5 and 6 of a first slot and SC-FDMA symbols 0, 1, 2, 3, 4 and 5 of a second slot of a subframe,
    based on the congestion level being greater than a congestion threshold, transmit (1) first sidelink control information (SCI) and a first sidelink message based on the first SCI among the plurality of sidelink messages through the first carrier and (2) second SCI and a second sidelink message based on the second SCI among the plurality of sidelink messages through the second carrier, wherein each of the first SCI and the second SCI comprises i) a priority field, ii) a resource reservation field, iii) a frequency resource location of initial transmission and retransmission field, iv) a time gap between initial transmission and retransmission field, v) a modulation and coding scheme (MCS) field, vi) a retransmission index field, and vii) reserved information bits, and based on the congestion level being lower than the congestion threshold, transmit the first SCI, the first sidelink message, the second SCI and the second sidelink message through the first carrier, wherein the first carrier and the second carrier are pre-configured by a network, wherein an importance level of the first sidelink message is higher than an importance level of the second sidelink message, and wherein the first sidelink message includes sensing information with minimum resolution performance supported, and the second sidelink message includes assistance information for increasing a resolution of the sensing information.

\* \* \* \* \*